United States Patent [19]

Willeitner et al.

[11] 4,285,611
[45] Aug. 25, 1981

[54] ARRANGEMENT FOR THE RETAINING OF TUBES

[75] Inventors: Eberhard Willeitner, Utting a. Ammersee; Wilhelm Hirschmann, Friedberg; Erwin Maier, Freising; Georg Lammel, Olching; Jurgen Hass, Munich, all of Fed. Rep. of Germany

[73] Assignee: Maschinenfabrik Augsburg-Nürnberg Aktiengesellschaft, Munich, Fed. Rep. of Germany

[21] Appl. No.: 43,544

[22] Filed: May 29, 1979

[30] Foreign Application Priority Data

Jun. 1, 1978 [DE] Fed. Rep. of Germany ....... 2824108

[51] Int. Cl.³ ............................................. F16B 2/14
[52] U.S. Cl. ................................. 403/374; 403/195;
 403/197; 285/137 A
[58] Field of Search ............... 403/195, 197, 240, 196,
 403/194, 374, 243, 238, 239, 371, 390; 285/137
 A, 137 R, 421, 194, 214; 24/122.6, 136 L, 136
 R, 115 M, 136 K

[56] References Cited

U.S. PATENT DOCUMENTS

| 3,605,202 | 9/1971 | DeValenzuela ..................... 24/122.6 |
| 3,868,191 | 2/1975 | King, Sr. ......................... 403/374 X |

FOREIGN PATENT DOCUMENTS

| 167601 | 2/1906 | Fed. Rep. of Germany ........... 403/195 |
| 684744 | 12/1939 | Fed. Rep. of Germany ........... 403/390 |
| 475664 | 3/1915 | France .................................... 403/390 |
| 302301 | 10/1932 | Italy ....................................... 24/122.6 |

Primary Examiner—Andrew V. Kundrat
Attorney, Agent, or Firm—Scully, Scott, Murphy & Presser

[57] ABSTRACT

Arrangement for retaining at least two approximately mutually parallel extending tubes, including an adapter having an aperture through which the tubes are conducted. A clamping element is arranged in the aperture intermediate the tubes and presses these against the wall structure of the aperture.

9 Claims, 4 Drawing Figures

ARRANGEMENT FOR THE RETAINING OF TUBES

BACKGROUND OF THE INVENTION

1. Field of the Invention

The present invention relates to an arrangement for retaining at least two tubes in an essentially mutually parallel relationship.

The utilization and fastening in place of tubes is common in numerous technical fields of application where the type of their fastenings or support is correlated with the present instance of application.

2. Discussion of the Prior Art

In the conduction of tubes through a wall, a plate or the like, these tubes are fixed in place in a known manner by means of devices, such as clamps or flanges, which are connected with the wall on one or both sides exteriorly of the wall structure. The disadvantage attendant to this concept lies in that the overall size of the installation, of which the tubes form a component, is increased by the fastening arrangement. This is the case, for instance, with centrifuges in which the infeed and withdrawal tubes are introduced into the interior of the centrifuge through a cover, and wherein these tubes must meet precise positional requirements.

It is also known to individually press the tubes through precision bores provided in the wall structure so as to directly support the tubes. In this arrangement large spacings must be provided between the individual tubes when several tubes are to be arranged side by side, which can be extremely disadvantageous in many instances.

SUMMARY OF THE INVENTION

Accordingly, it is an object of the present invention to provide an arrangement of the above-mentioned type for interconnecting precisely positioned or otherwise fixing several tubes in a space-saving manner.

It is a particular object of the present invention to provide an adaptor having an aperture and a clamping element in which the tubes are conducted through the aperture and are fixed in place by biasing them against the wall of the aperture through the action of the clamping element which is inserted in the aperture between the tubes.

Through an arrangement of this nature several tubes are firmly secured in place within a relatively close space directly within a plate or a wall without the application of fastening elements above and/or below the plate.

The arrangement is also suitable for merely holding together a plurality of tubes as is the case, for example, of extremely lengthy free standing tubes. The arrangement is particularly advantageous in the case of centrifuges, wherein the feed tube and, in general, two extraction tubes are conducted through the centrifuge cover and in some manner must be precisely fixed in position. Considering that a bearing must also be provided at the end of the centrifuge, the inner space of this bearing can be used for building in of the tube support or restraint.

Moreover, the retaining arrangement of the present invention is particularly advantageous in such centrifuge systems in which, depending upon the design of the cover, use can be made of the bearing or other necessary components through which the tubes are conducted, for the installation of the arrangement.

In order to improve the fixings and guidance of the tubes, the present invention further proposes that the aperture be equipped with grooves for the individual tubes, against which the tubes are pressed in by means of the clamping element. These grooves can also be formed by the edges of an aperture having a polygonal cross-section.

Pursuant to a modified embodiment of the present invention, a flange is formed by being directly cast into the component through which the tubes are to be conducted.

Depending upon the number of tubes and the available space, use can be made of spreader arrangements formed of metal or plastic, and spring arrangements or flexible plugs as the clamping elements.

BRIEF DESCRIPTION OF THE DRAWINGS

Reference may now be made to exemplary embodiments of the present invention, taken in conjunction with the accompanying drawings, in which.

DETAILED DESCRIPTION

Figure 1:
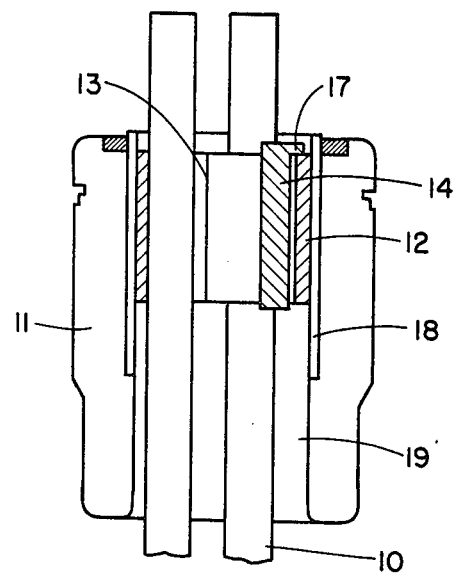
FIGS. 1 and 2 are respectively elevational and plan views illustrating a first embodiment of the inventive tube retaining arrangement.
Figure 2:
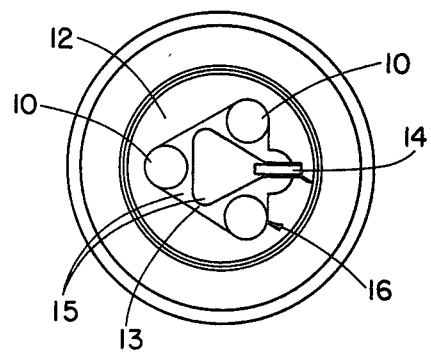

FIGS. 1 and 2 illustrate an embodiment in which the three pipes or tubes 10 are conducted through and secured in a structural member 11 which, for example, may be a damping bearing of a centrifuge. Serving this purpose is an arrangement consisting of an adapter 12, a spreader spring 13 and a clamping member 14. The adapter includes an aperture 15 of approximately triangular cross-section, with the tubes 10 being arranged in the corners thereof. The triangularly bent spreader spring 13 serves to bias the tubes 10 against the wall of the opening 15 and to restrain them in their position. In order to ensure the tension of the spreader spring 13, the clamping member 14 is inserted between the correspondingly bent ends of the clamping element 13. The clamping member 14 is provided with a retaining projection 17 by means of which the arrangement is supported on the adapter flange 12. In that manner the tubes 10 are kept from sliding through the adapter in vertical arrangements. It is also possible to contemplate clamping elements in the shape of springs.

According to the embodiment of FIG. 1, the adapter 12 is arranged within a ring 18 and is bonded or clamped thereto.

Figure 3:
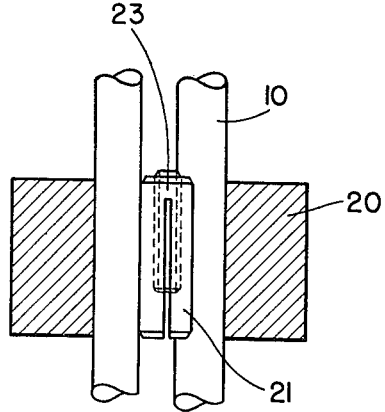
FIGS. 3 and 4 are, respectively elevational and plan views illustrating an alternative embodiment of the invention.
Figure 4:
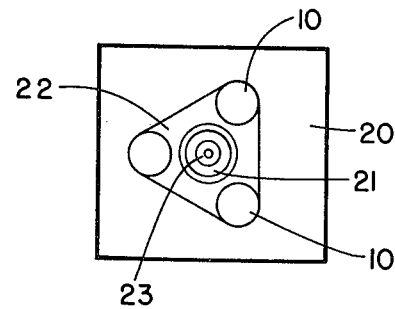

Having refernce to FIGS. 3 and 4, a retaining arrangement having an adapter 20 and a dowel-like spreader element 21 is shown within a triangular aperture 22. The dowel 21 is urged against the tubes 10 by means of a tension member 23. In this arrangement, the tubes 10 are firmly secured in their position within the adapter 20 and are so conducted through the wall structure of the aperture 22 in the intended position, whereby the tubes 10 and the device 20, 21 form a rigid constructional unit for insertion or arrangement at its predetermined location.

The dowel 21 may also be constituted of an elastomeric plug which is inserted with or without the tension member 23.

The above-described embodiments have each been considered in connection with three tubes. However, it is possible to construct the arrangement for two, or more than three tubes by imparting to the aperture, for instance, an oval, square or other suitable cross-section. It is also possible to employ circularly cylindrical apertures, when it is necessary, to have longitudinal grooves therein which will ensure guidance of the tubes.

Furthermore, it is also possible to fill the voids between the tubes 10 within the aperture with a resilient filler compound into which there can be pressed a centrally arranged clamping wedge.

The above-described arrangements also provide the advantage that they can be made of the widest variety of materials to afford good correlation with current requirements. The flange and the clamping element can be constructed of metal, plastic, resins, epoxy resins or elastomers. The same applies to the clamping wedge or spring when such may be required.

A further advantage provided by the detachable tube retaining arrangement is a high degree of reproducibility in the tube positions.

What is claimed is:

1. An arrangement for retaining at least two tubes in substantially mutually parallel positions, comprising a single piece adapter having a single bore having a polygonal cross cross sectional shape through which the tubes are inserted, and a clamping element arranged in said bore between said tubes, said clamping element including means for radially expanding in said single bore to bias said tubes in positions parallel to each other against the wall of the single bore without causing an axial displacement of the tubes.

2. An arrangement as claimed in claim 1, said adapter including grooves in said bore for the individual tubes, said tubes being biased against said groove by said clamping element.

3. An arrangement as claimed in claim 1, said adapter being formed from a plastic material.

4. An arrangement as claimed in claim 1, said adapter being formed of metal.

5. An arrangement as claimed in claim 1, said tubes and said adapter adapted to be arranged in a housing, said adapter being formed of a plastic material molded into the housing.

6. An arrangement as claimed in claim 1, said clamping element comprising a spreader device.

7. An arrangement as claimed in claim 6, including a clamping wedge to bias said spreader device against the tubes.

8. An arrangement as claimed in claim 6, including a spring to bias said spreader device being biased against the tubes.

9. An arrangement as claimed in claim 1, said clamping element comprising a spring means.

* * * * *